Sept. 14, 1965  R. G. McGRATH  3,206,371
METHOD OF OPERATING A REACTOR DURING START-UP OR SHUT-DOWN
Original Filed Sept. 2, 1958  5 Sheets-Sheet 1

Fig.1.

WITNESSES
John E. Heasley Jr.
Leon M. Garman

INVENTOR
Robert G. McGrath
BY
Donald Smith
ATTORNEY

United States Patent Office 3,206,371
Patented Sept. 14, 1965

3,206,371
METHOD OF OPERATING A REACTOR DURING START-UP OR SHUT-DOWN
Robert G. McGrath, Penn Hills Township, Allegheny County, Pa., assignor to Westinghouse Electric Corporation, Pittsburgh, Pa., a corporation of Pennsylvania
Continuation of abandoned application Ser. No. 758,360, Sept. 2, 1958. This application Dec. 28, 1962, Ser. No. 248,155
4 Claims. (Cl. 176—48)

This application is a continuation of applicant's copending application of the same title filed September 2, 1958; Serial No. 758,360, now abandoned.

The present invention relates to a method for operating a neutronic reactor, particularly during starting up or shutting down thereof.

In certain types of neutronic reactors, an example of which is described hereinafter in greater detail, the reactor and the primary circulating systems associated therewith are arranged for adding or withdrawing, or otherwise supplying nuclear fuel or fissile material to the reactor in varying masses or concentration relative to the volume comprised within the reactional vessel. The quantity of fuel contained within the reactional vessel may be varied in a number of ways. For example, a number of fuel rods containing fissile material can be inserted into or withdrawn from the reactional vessel in the manner in which the control rods of certain types of reactors are moved relative to the vessel, or the fissile material might be conveyed in varying quantities to the reactor vessel in a form of a fluidized solid or in a form of larger discrete particles either of which may be supported by a gas or other vehicular fluid. In still other neutronic reactor systems the fissile material can be supplied to the reactional vessel in the forms of a metallo-organic compound of the fissile material which is a liquid at reactor operating temperatures, a solution of a soluble fissile material such as uranylsulfate, or as a suspension or slurry of desirably ultra fine particles of the fissile material or their oxides in a suitable vehicle such as that described hereinafter. Although the invention disclosed herein is adapted for use in operating many of the aforementioned variable concentration-type reactors, the invention will be described in greater detail in connection with a quasi-homogeneous, slurry-type reactor.

It has been found that, in certain neutronic reactors wherein exhibiting a negative temperature coefficient and the concentration of the fuel can be varied readily, there are two concentrations of the fuel whereat the neutronic reactor can maintain criticality ($K_{eff.}=1$) at a given operating temperature which is less than the maximum workable temperature obtainable by the reactor. These chain-reacting concentrations are designated as respectively the high and low critical concentrations or points. However, in the range of fuel concentrations between these critical concentrations, the reactor would become supercritical ($K_{eff.}>1$) relative to the aforesaid operating temperature; and the temperature would increase markedly, if no means wer employed to control the reactor until $K_{eff.}$ would again become unity or less, provided the reactor system could withstand the added thermal strains. Obviously it is desirable to operate the reactor system at an operating temperature less than the maximum workable temperature to reduce such thermal strains to allowable margins of safety. Moreover, it is desirable to operate the neutronic reactor at the high critical concentration corresponding to the aforesaid operating temperature for the reason that, with the added fissile material thereby included within the reactor vessel, a greater neutronic economy is obtained; and hence a greater conversion ratio of the fertile isotope, usually included in the fissile material, to one of the fissionable isotopes is likewise secured. It has likewise been found that when operating an efficient neutronic reactor at the high critical concentration that conversion ratios of unity or greater can be obtained, that is to say, that at least as much fissionable isotope can be transmuted from the fertile material as is consumed in the chain reaction sustained in the intial supply of fissionable isotope. The basic mechanisms whereby the fertile isotopes are converted into the corresponding fissionable isotopes in a neutronic reactor are described hereinafter in greater detail.

As pointed out previously, however, the average temperature of the reactor rises to a high peak at a certain fuel concentration between given high and low critical points, as the concentration is raised from the low critical point to the corresponding high critical point of a given operating temperature, if all other factors remain the same. This condition results in the aforementioned supercritical condition wherein the effective constant of criticality ($K_{eff.}$) would become slightly greater than unity for the range of concentrations between these critical points, if the temperature were to remain constant. The temperature upswing in certain cases, however, can be sufficiently high, if uncontrolled, to exceed the design limitations of the reactor and the associated primary equipment.

In spite of the foregoing remarks, it has been found that the safest method of adding fissile material to the reactor is to fill the primary reactor system initially with either a dilute mixture of fissile material and a suitable vehicle or with the vehicle alone. The dilute mixture, if employed, is maintained at a concentration which is sufficiently low to preclude criticality under any conditions. The concentration of fissile material then is gradually increased through the low critical concentration to the high critical concentration or operating concentration.

As the concentration is increased between the low and high critical concentrations, suitable means are employed to control the reactor in the area of supercriticality between these concentrations. Desirably, the reactor is operated for a time at the low critical concentration in order to produce sufficient internal $Xe^{135}$ to shut down the reactor while the concentration is being increased from the low to the high critical concentration. This method of operating the reactor is described fully and claimed in a copending application of William A. Frederick, entitled "Method of Operating a Nuclear Reactor," filed December 20, 1957, S. N. 704,098, now U.S. Patent 3,155,596, dated November 3, 1964, and assigned to the present assignee. Alternatively, an external reactor poison, for example a boronic compounds, can be added to the primary system in accordance with known methods; or on the other hand the primary reactor system can be designed to withstand the higher temperature necessary to shut down the reactor due to the negative coefficient of reactivity exhibited by thermal and epithermal reactors and described hereinafter.

It may be suggested that the reactor system be filled initially with fissile material at a concentration above the high critical concentration, which is then gradually reduced to the operating concentration. This method is not feasible due to the possibility of a portion of fissile material settling out of the vehicle after addition to the reactor, particularly before the circulating pumps can be started, and to the attendant great danger of unpredictable criticality in the fiissile material when thus diluted. Moreover, the fissile material would have to be maintained at an increasingly high temperature as the concentration is reduced in order to preclude premature criticality. For practical purposes, then, the reactor system would have to be raised to operating temperature by means of an external source of heat before beginning to decrease the concentration of fissile material in order to preclude the possibility of thermal shock.

It may be suggested also that the primary reactor system be filled initially with fissile material at the operating or high critical concentration. This method likewise is inappropriate due to unpredictable reactivity of the fissile material while being added in this concentration. Both the reactor system and fissile material would have to be preheated in some fashion to a temperature in excess of operating temperature to prevent premature criticality and thermal stresses in the reactor system. Moreover, when employing certain types of vehicles for the fissile material, these vehicles must be maintained under considerable pressures to prevent boiling at the operating reactor temperatures. However, the required pressurizing is impractical until the reactor system, including usually a reactional vessel and a number of circulating or cooling loops, is completely filled. Furthermore, the primary circulating pumps cannot be started until the reactor system is completely filled, if the fissile material is in liquid form, because of vapor binding. Consequently, a portion of the fissile material may settle out of the vehicle, whereupon the concentration of the remaining fissile material may fall into the aforementioned supercritical area between the low and high critical concentrations.

Specifically, the invention relates to an apparatus and method for use in starting up and shutting down a neutronic reactor so that the reactor can be initially filled either with a very dilute mixture of fissile material in a suitable vehicle or with the vehicle alone. Subsequently, the concentration of the fissile material is gradually increased by means provided in accordance with the invention until the desired operating concentration is attained. In shutting down the reactor the reverse procedure is followed. The aforementioned apparatus is arranged so that the rate of increase or decrease in fissile concentration within the primary reactor system can be readily changed or otherwise controlled in order to avoid large inputs of reactivity in the primary reactor system. Although the invention is described hereinafter in conjunction with a slurry type homogeneous reactor having high and low critical fuel concentrations, it will be obvious as this description proceeds that the invention is not limited thereto.

In view of the foregoing it is an object of the invention, to provide a novel and efficient neutronic reactor system particularly of the type in which the fuel concentration thereof can be readily varied.

Another object of the invention is to provide novel apparatus adapted for use with a neutronic reactor for the purpose of facilitating filling and draining the primary system thereof.

Still another object of the invention is to provide a novel method and apparatus of the character described for varying the fuel concentration of a homogeneous or quasi-homogeneous type reactor in a carefully controllable manner.

A further object is the provision of apparatus of the character described which is adapted for coupling to the primary circulating system of a reactor and which is operable without the use of additional pumping means.

These and other objects, features and advantages of the invention will be made apparent during the forthcoming description of an illustrative embodiment of the invention with the description being taken in conjunction with the accompanying drawings wherein.

Generally speaking, in a homogeneous-type reactor system, the nuclear fuel is contained within the system as a liquid or suspension, which in some cases may be a liquid compound of at least one of the fissile isotopes noted below. In other cases, the liquid fuel comprises a suspension in a suitable vehicle of a pulverulent form of one or more of these fissionable and fertile isotopes, or a combination thereof, or a solution of one or more cmpounds thereof in a suitable solvent such as water. In those systems wherein the fuel is employed as a conventional suspension or slurry or in some other fluidized form wherein the fuel is present in discrete, movable particles, the reactor system is sometimes designated as quasi-homogeneous. As explained more thoroughly hereinafter, the fluidized fuel is circulated through a reactor vessel by one or more primary circulating loops provided with suitable pumping means. The fluid fuel including the vehicle or solvent, which usually serves both as coolant and moderator, thus circulates through both the vessel and the circulating loops in contradistinction to a heterogeneous type reactor system. In the latter class of reactors the fuel, moderator, and the coolant or coolant-moderator usually are physically separated and at least the fuel is mounted fixedly and entirely within the reactional vessel.

The homogeneous reactional vessel is fabricated of such size and shape that a quantity of the circulating fluid fuel contained therein is equivalent to the critical mass of the chain-reacting isotope included in the fuel and consequently a self-sustaining chain reaction can be established in the vessel. In the case of a quasi-homogeneous reactor, the concentration of the fissionable or chain-reacting isotope in the slurry or suspension can be adjusted within rather wide limits such that the aforesaid size and shape of the vessel can be varied accordingly as desired. As pointed out hereinafter, the remaining components of the system are insufficient in size and are suitably spaced or shielded such that a critical mass cannot be accumulated elsewhere in the reactor system. The heat developed within the circulating fuel as a result of the nuclear chain reaction is removed from the fuel as it circulates through the primary loops by suitable heat exchanging means coupled within each of these loops.

The vehicle or solvent employed with the circulating fuel, which may be ordinary water ($H_2O$), heavy water ($D_2O$) or an organic material having the desired characteristics of temperature and radiation stability, serves as a moderator for the chain reaction in addition to serving as a heat transfer medium as noted heretofore. As is well known, a moderator material usually is employed adjacent the nuclear fuel to slow the fast neutrons produced by each fission to thermal velocity, whereat the neutrons are most efficient for inducing fission in atoms comprising the fissionable isotopes. More specifically, the moderator material slows neutrons having energies in the neighborhood of ten million electron volts to energies which are equivalent to thermally excited hydrogen atoms or about 0.1 electron volt. As a result, the moderator material appropriately is selected from a material having the characteristics of low neutronic capture cross-section and a high neutronic scattering cross-section. Suitable materials for these purposes include carbon and the vehicles or solvents noted heretofore, i.e., light and heavy water, and hydrocarbon organic materials which, of course, contain carbon and hydrogen.

The homogeneous reactor system, presently to be described, is controlled inherently by the negative temperature coefficient of reactivity associated with the circulating nuclear fuel. This phenomenon is comparatively well known and is based upon the fact that an increase in temperature of the fuel contained within the reactor vessel decreases the density of both the fuel and the vehicular moderator and likewise its moderating characteristics. By the same token, this decrease in density increases the number of neutrons which are lost from the periphery of the chain-reacting mass, and the resulting loss in neutron economy decreases the reactivity of the reactor system. Additional control is accomplished, as required, by diluting the circulating fuel with additional vehicle or solvent, by adding a neutron absorbing poison such as cadmium, boron, or xenon, or by draining the contents of the reactional vessel into a series of storage tanks presently to be described. The latter arrangement also serves to terminate the chain reaction completely in an emergency or to shut down the reactor for maintenance and the like.

The fissional products which are formed during operation of the reactor desirably are extracted continually from the system by means of chemical processing in the case of solids, or in the case of gases, by means of an off-gas system such as that described in copending applications of D. Rinald and of J. Weisman et al., filed October 21, 1957, Serial No. 691,264 and 691,263, now Patents 3,080,307, dated March 5, 1963, and 3,093,564, dated June 11, 1963, respectively, and both assigned to the present assignee. These fissional products cannot be permitted to accumulate within the reactor system during normal operation thereof inasmuch as some of the daughter isotopes, particularly xenon 135, quickly terminate or poison the chain reaction although present in relatively small concentrations. As pointed out hereinafter in greater detail, use can be made of this fact in controlling and opertaing a variable fuel concentration type reactor. In any event, the accumulation of these isotopes which result either directly, or indirectly through radioactive decay, from the fissional process would tend to increase radioactivity assoicated with the reactor plant as compared to the conditions obtaining were the fissional products continuously removed. As a result, the normal biological shielding requirements for the reactional vessel, the fuel circulating loops, and associated equipment would be increased. Moreover, many of the longer-lived, fission-produced isotopes are valuable per se for those research, industrial, and medicinal applications, which require high levels of the various radioactive emanations.

The circulating nuclear fuel in a "simple burner" type homogeneous reactor, contains a high percentage of one or more of the known fissionable isotopes $_{92}U^{233}$, $_{92}U^{235}$, $_{94}Pu^{239}$, amounting of course, to a quantity sufficient to sustain a chain reaction. Although a simple burner type of reactor is relatively more efficient as to size and neutron economy, its overall fuel cost is very high. Moreover, substantially no additional fuel is produced during operation of this type of nuclear reactor. On the other hand, in "regenerative" or "breeder" types of homogeneous reactors, an additional quantity of a fertile isotope such as $_{90}Th^{232}$ or $_{92}U^{238}$ is admixed uniformly with the circulating fuel material. The latter-mentioned fertile isotope can be supplied in the form of natural or source grade uranium which is primarily the $U^{238}$ isotope containing approximately 0.7% of $U^{235}$. In a heterogeneous type reactor, the same combinations of fissionable and fertile isotopes can be employed, with the exception that both groups of the fissile isotopes are fixedly mounted within the reactor core and that the fertile isotope, commonly referred to as "blanket" material, usually surrounds the fissionable material. However, in a uniform, low enrichment heterogeneous reactor, several designs of which are either extant or under consideration, the so-called blanket or fertile material, of course, is mixed uniformly with the fissionable isotope. In the latter class of reactors, $U^{238}$ usually is employed which has been enriched to a greater than natural percentage of $U^{235}$. In an efficient reactor of the previously-mentioned regenerative types, it is possible to generate from the one or more fertile isotopes at least as much fissionable isotopes as is consumed in the chain reaction. If the conversional ratio is greater than unity, the reactor is classified in the breeder category.

During the progress of the chain reaction, each fissioned atom emits an average of two to three neutrons, some of which are classified as fast neutrons and must be slowed to thermal energies as noted previously. Approximately one of these neutrons is utilited in propagating the chain reaction. Another one of the neutrons is employed to initiate one of the series of nuclear reactions described below, whereby an atom of the fertile or blanket material is transmuted into an atom of fissfonable isotope, and the amount thereof may be equivalent, for example, to the amount of fissionable material consumed in the chain reaction. If such is the case, only the fertile material need be added to the reactor system during its operation. The remainder of the fission-produced neutrons are absorbed in structural and moderator materials, in non-fissioning capture of atoms of fissile material, and in peripheral escape from the chain-reacting mass.

Upon capturing one of the aforesaid fissional neutrons the fertile material $_{92}U^{238}$, if employed, is converted into an isotope of the transuranic element plutonium $_{94}Pu^{239}$, in accordance with the following nuclear equations:

with the times denoted at the latter two reactions being the half-lives of the decaying isotopes. The transuranic isotope $_{94}Pu^{239}$, which is one of the aforesaid fissionable isotopes, is endowed with a half-life of 24,000 years and thus is relatively stable.

On the other hand, the artificial, fissionable isotope $_{92}U^{233}$ is obtained when thorium 232 is employed as the fertile or blanket material. The $U^{233}$ isotope is formed as a result of the following series of nuclear reactions:

The resultant fissionable isotope $U^{233}$, having a half-life of 163,000 years, likewise is relatively stable.

Figure 1:
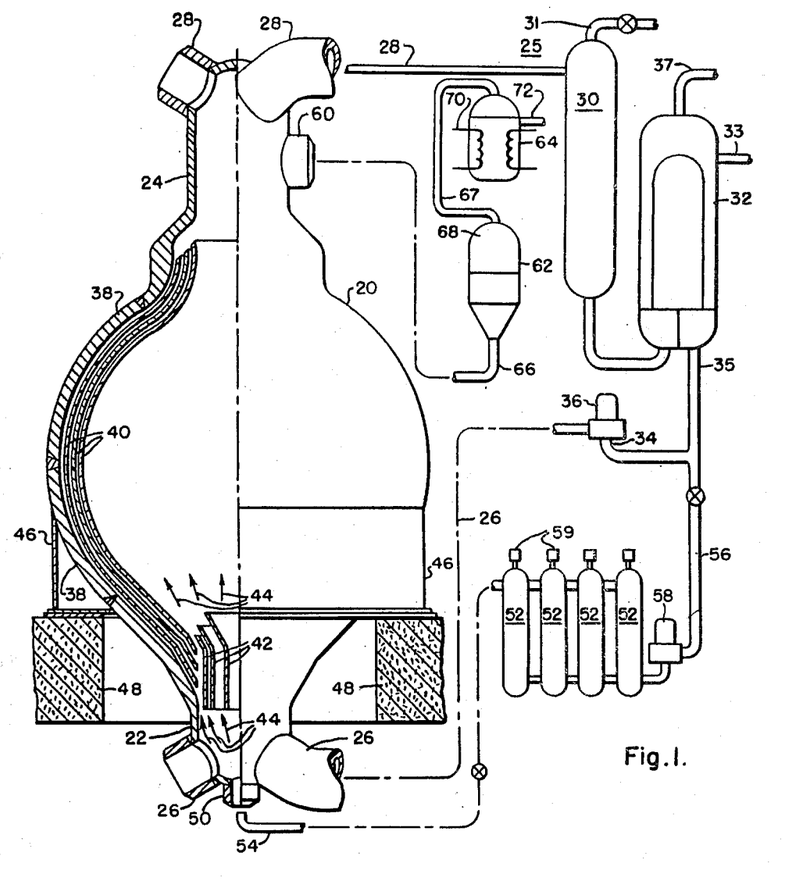
FIG. 1 is a schematic and elevational view, partially sectioned, of any exemplary homogeneous-type reactional vessel shown in conjunction with primary coolant loop circuitry.

Referring now more specifically to FIG. 1 of the drawings, an exemplary variable fuel concentration type of reactor system is disclosed, which is adapted for operation in accordance with the invention. In this example, the reaction system is a quasi-homogeneous, or slurry-type system, and comprises a reactional vessel 20 having a spheroidal configuration and provided at diametrically opposite areas thereof with inlet and outlet manifolds 22 and 24, respectively. The reactional vessel 20 is of sufficient size to contain, as aforesaid, a critical mass of the circulating nuclear fuel flowing through the vessel and the primary loops of the reactor system. In this application, wherein a circulating slurry containing suspended, uniformly, admixed, pulverulent oxides of thorium ($ThO_2$) and highly enriched uranium $UO_2$ is employed, with a vehicle including deuterium oxide or heavy water ($D_2O$), the inside diameter of the innermost reactor vessel thermal shield 40 is of the order of 13 feet. The aforementioned slurry, which is described subsequently in greater detail, thus includes a fissionable material in the form of uranium 235 and a fertile material, thorium 232. Additionally, a small proportion of the fertile material, uranium 238, is included unavoidably with the $U^{235}$ isotope.

Figure 2A:
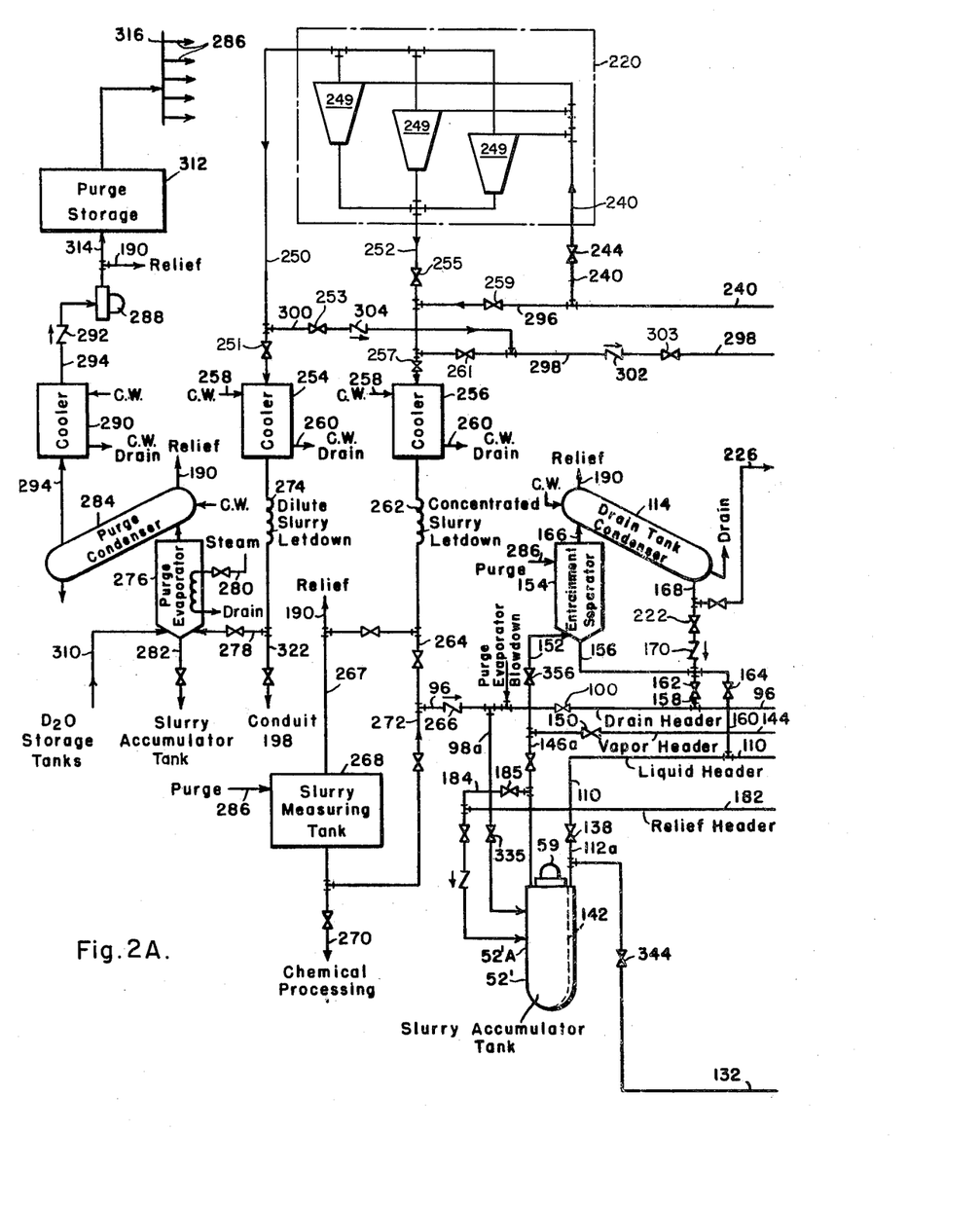
FIGS. 2A, 2B, 2C constitute a schematic fluid circuit diagram of a homogeneous reactor system such as that illustrated more generally in FIG. 1 and arranged for use with certain auxiliary equipment.
Figure 2B:
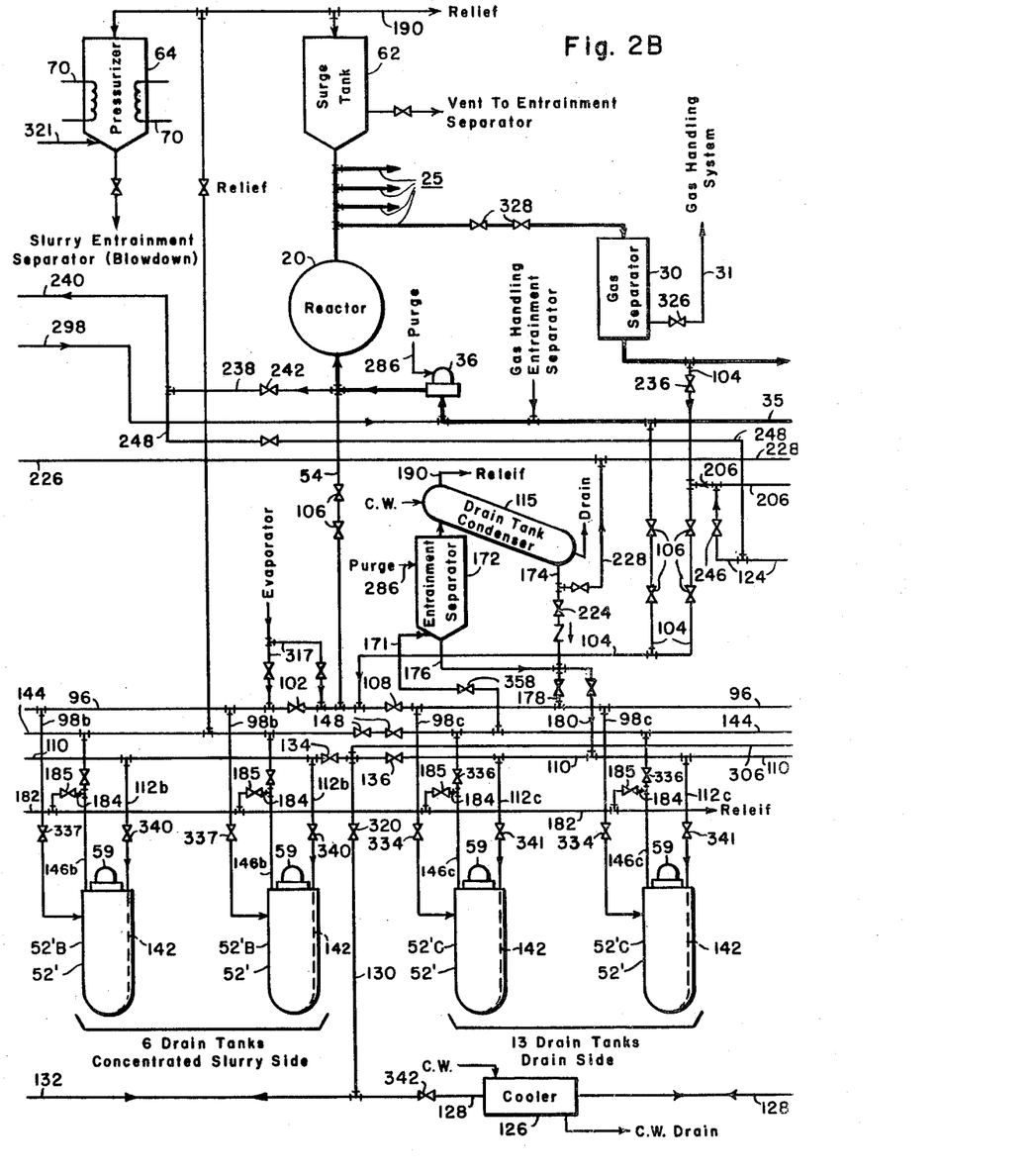
Figure 2C:
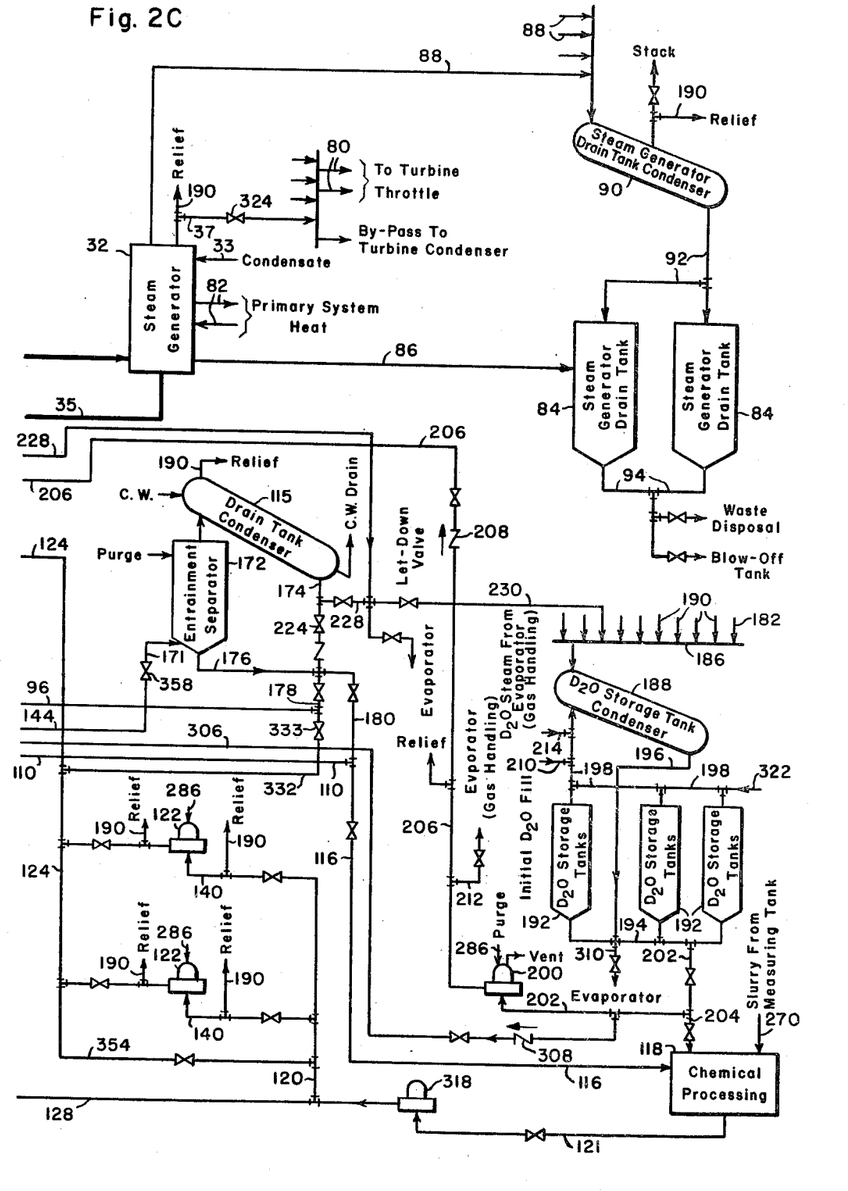

In this example of the homogeneous reactor system a total of four circulating loops, with only one loop 25 being shown in FIGS. 1 and 2, are connected to the intake and outlet manifolds 22 and 24 by means of inlet and outlet conduits 26 and 28, respectively. The outlet conduit 28 is connected to a gas separator 30 which in turn is coupled in series with a steam generating heat exchanger 32 coupled through a conduit 35 to the suctional side 34 of a primary slurry pump 36. The gas separator 30 is designed in a conventional manner and is arranged to remove fissional and radiolytic gases from the system, which gases are conducted out of the separator by means of a conduit 31. The steam generator 32 which is provided, inter alia, with a feed water inlet 33 and a steam outlet conduit 37 is constructed similarly to that described in a copending application of William A. Webb et al., entitled "Remote Equipment Maintenance," Serial No. 659,002, filed May 15, 1957, assigned to the present assignee and now abandoned. The discharge side of the pump 36 is coupled to the inlet conduit 26 and manifold 22 of the reactor vessel.

In this example, the reactor vessel 20 is formed from a plurality of spheroidal sections 38 which are welded together as shown to form the completed vessel. In order to minimize neutron-induced thermal stresses within the walls of the vessels 20, which are of the order of six and one-half inches in thickness, a plurality of thermal shields, indicated generally by the reference character 40, are disposed adjacent the inner surface of the reactor vessel walls. The thermal shields 40 conform generally to the inner configuration of the vessel walls and are spaced therefrom and from one another in order to provide, in this example, flow channels therebetween for the passage of a peripheral portion of the circulating nuclear fuel. Inasmuch as the thermal shields 40 are subjected to little or no pressure differentials, they are made relatively thin with respect to the vessel walls 20. A plurality of baffles 42 are disposed adjacent the lower or intake manifold 22 and are suitably shaped for distributing the incoming slurry as indicated by flow arrows 44 throughout the interior areas of the vessel 20 and for diverting a peripheral portion of this flow through the passages formed between the thermal shields 40 and adjacent the inner wall of the vessel 20. A neutron reflecting member (not shown) can be disposed adjacent the thermal shields to reflect peripheral neutrons back into the central region of the vessel 20 in order to improve the neutron economy of the chain reaction.

The disposition of the thermal shields 40 in this manner substantially prevents impingement of fission-neutrons upon the adjacent vessel walls. Accordingly, the heating effect of the impinging neutrons is developed almost entirely within the thermal shields 40 which are not subject to pressure stresses as are the walls of the pressurized vessel 20. Moreover, the heat developed within the thermal shields 40 is readily removed by the peripheral portion of the circulating fuel flowing through the channels therebetween. Alternatively, the thermal shields 40 can be replaced by the shield arrangement disclosed and claimed in a copending application of W. P. Haass, entitled "Reactional Vessel," Serial No. 652,627, filed April 12, 1957, now U.S. Patent 3,075,909, dated January 29, 1963, and assigned to the present assignee.

The pressurized reactional vessel 20 is mounted upon an annular supporting collar indicated generally by the reference character 46 and mounted upon a biological shielding wall portion or support 48. This mounting arrangement for the reactor vessel 20 and the physical distribution of the primary circulating loops and other equipment associated therewith are described in greater detail in a copending application of W. A. Webb et al., entitled "Shielded Reactor Plant Arrangement and Personnel Access Means Therefor," Serial No. 659,004, filed May 14, 1957, now U.S. Patent 3,113,915, dated December 10, 1963, and assigned to the assignee of the present invention.

In order to drain the contents of the reactional vessel, a drain outlet 50 disposed in the lower or intake manifold 22 is coupled to a series of slurry drain tanks 52, through a conduit 54. When it is desired to fill the reactor system, the slurry contained in the drain tanks 52 is returned through another conduit 56 which is coupled to one or more of the circulating loop conduits 35. To aid in filling the reactional vessel and associated loops, an auxiliary slurry pump 58 is coupled into the conduit 56. The physical disposition of the drain tanks 52 relative to the nuclear power plant arrangement is described in greater detail in the last-mentioned copending application. For the present, it may be pointed out that the drain tanks 52 are provided in sufficient number to contain at least all of the circulating nuclear fuel slurry of the system but are of such size that none of the tanks can contain a critical mass of slurry. Suitable neutron-absorbing material (not shown) is disposed between adjacent tanks in order to prevent the development of a chain reaction within the collective group of tanks when they are filled with the circulating fuel.

In one exemplary arrangement, the fluid fuel contained within each of the drain tanks 52 is stirred constantly by individual agitators and stirrers 59 mounted adjacent the top of each of the tanks 52. The tanks 52 and the agitators 59 desirably are hermetically sealed to prevent leakage of biologically hazardous fluid and desirably are provided in the form of that disclosed and claimed in a copending application of Mei and Widmer, entitled "Sealed Agitator," Serial No. 672,661, filed July 18, 1957, and now U.S. Patent 2,907,552 assigned to the present assignee.

The upper or outlet header 24 is fitted with an additional port 60 to which a surge tank 62 is coupled by means of a conduit 66. In one form of homogeneous reactor system, the surge tank 62 comprises a relatively large volume which, however, is insufficient to contain a critical mass of the circulating fuel. When in operation, a vapor space 68 is formed in the surge tank, which conveniently contains a vapor of the vehicle employed in suspending the aforementioned fissionable and fertile oxides. As a result, during a positive system transient within the homogeneous reactor system, a surge of liquid into the tank 62 compresses the vapor confined within the surge tank space 68, thereby relieving at least partially the increased pressures developed within the system.

A pressurizing vessel 64, which is coupled to the surge tank 62 by a conduit 67 connecting the vapor spaces thereof, is furnished with a number of heating elements, indicated generally by the reference characters 70 and arranged for heating a portion of liquid, desirably the same as the aforementioned liquid vehicle of the system. Thus, the reactor system is maintained at the desired operating pressure, by vaporization of the aforesaid vehicle portion. As a corollary function the pressurizing vessel 64 operates to maintain the aforementioned vapor space or surge volume 68 within the surge tank 62. The pressurizing vessel 64 is provided with an inlet conduit 72 whereby the vessel 64 is initially charged with the aforesaid vehicle portion and make-up vehicle is added to the pressurizing vessel as required.

Alternatively, the pressurizing vessel 64 and the surge tank 62 can be replaced by the pressure regulating system claimed and disclosed in a copending application of Jules Wainrib, entitled "Pressure Controlling System," Serial No. 677,942, filed August 13, 1957, now U.S. Patent 3,060,110, dated October 23, 1962, and assigned to the present assignee.

Referring now more particularly to FIG. 2 of the drawings, the various auxiliary equipment associated with the aforedescribed homogeneous reactor system, is illustrated schematically therein. In the arrangement of the homogeneous reactor system, illustrated in FIG. 2, the primary slurry pump 36 is furnished with a capacity of approximately 8,000 gallons per minute which in conjunction with three other primary slurry pumps (not shown) disposed in a like number of similar circulating loop systems indicated generally by arrows 25, produces a total rate of flow of approximately 32,000 gallons per minute. Inasmuch as the reactor vessel 20 and the circulating loops together enclose a total volume of approximately 19,000 gallons, the circulating fuel is recycled through the system in about one-half minute.

In this application of the invention, the circulating slurry comprises a vehicle of deuterium oxide ($D_2O$) in which is suspended about 300 grams of thorium oxide ($ThO_2$) per kilogram of $D_2O$ and approximately ten grams of uranium oxide ($UO_2$) per kilogram of $D_2O$. The uranium in this example is "fully enriched" and contains upwards of 90% of $U^{235}$ isotope. Added with the uranium oxide is a very small proportion of a palladium catalyst employed to promote internal recombination of the major proportion of the radiolytic vehicular gases, deuterium and oxygen. The uncombined or remaining radiolytic gases are employed to sweep fissional product gases out of the system, as explained hereinafter. The quantity of palladium catalyst, which is added in the form of the oxide (PdO) is of the order of 0.001 gram per liter of slurry and can be replaced, if desired, by other suitable catalysts, for example, a platinum compound.

Accordingly, the system circulates a mixed oxide slurry with a total oxide concentration in excess of 300 grams per kilogram of $D_2O$ which corresponds to a solids content of about 3% by volume. The reactional vessel 20 and the circulating loops 25 are maintained under a pressure in the neighborhood of 2,000 pounds per square inch absolute by operation of the pressurizing vessel 64. The pressurizing vessel 64, which desirably contains only deuterium oxide or other such vehicle employed in the homogeneous system as noted heretofore, is separated from the liquid or slurry portion of the surge tank 62 by means of the steam space 68 thereof, to which the conduit 67 is coupled, thus avoiding the caking that would result if the circulating slurry itself were boiled in the pressurizing vessel 64.

Leaving the reactional vessel 20 the slurry stream branches into four parallel identical circulating loops 25 only one of which is illustrated in detail. If desired, each loop can be isolated from the reactor by a pair of dual stop valves 328 (FIG. 2) to permit certain types of remote or semi-direct maintenance, without shutting down the entire plant, to be performed on one of the circulating loops, for example, in the manner described in the copending, coassigned applications of Huston et al., Serial No. 659,003, entitled "Semidirect Equipment Maintenance," filed May 14, 1957, now U.S. Patent 3,090,740, dated May 21, 1963, and of Webb et al., Serial No. 659,002 entitled "Remote Equipment Maintenance," filed May 14, 1957, and now abandoned.

Within the reactor vessel 20 part of the kinetic energy of the fissional fragments is absorbed by the deuterium oxide molecules, some of which are disassociated into deuterium and oxygen gases. For the most part these radiolytic gases are recombined within the reactor system through usage of the palladium catalyst noted above. However, the remaining portion of these radiolytic gases is removed together with certain gaseous fission products by means of the gas separatous 30 and conveyed through the conduit 31 to an external recombining unit associated with a suitable gas handling system (not shown). Suitable forms of gas handling systems adapted for recombining the radiolytic gases and for separating and eliminating the fissioned product gases are disclosed and claimed in Patents 3,080,307 and 3,093,564, above referred to.

From the gas separators 30 the circulating slurry in each loop 25 is conducted to the respective steam generators 32, as noted heretofore. The steam developed in the steam generators is conducted through the outlet conduits 37 and conduits 80 to suitable steam utilizing means, for example, one or more turbo-electric generators (not shown). In addition, a small portion of the steam is removed from one of the steam generators 32 and returned thereto by means of conduits 82 for the purpose of supplying heat to various components of the primary reactor system. A plurality of storage tanks 84, with two being shown for purposes of illustration, are coupled to the steam generators by means of a conduit 86 for purposes of draining the steam side of the steam generators in the event of leakage of radioactive slurry into the steam side of the generators or other defect. Any vapor contained at this time within the steam generators is removed through overhead conduit 88 to a steam generator drain tank condenser 90. This vapor after being condensed in the condenser 90 is conducted to the aforementioned drain tanks 84 through a conduit system 92. In the event that the contents of the steam generator drain tanks 84 become radioactive the contents can be conveyed through the valved conduit system 94 to suitable means for concentrating or otherwise preparing the radioactive material for underground or oceanic burial.

As indicated heretofore, four circulating loops indicated generally by the reference character 25, are associated with the reactor vessel 20; however, in the drawings only one of these loops are shown in detail, inasmuch as in this example these loops are substantially identical. However, as will be described subsequently in greater detail, the piping connections associated with one of the circulating loops 25 differs slightly in that certain auxiliary equipment associated with the reactor system are coupled to only one of the circulating loops 25. In the case of the reactor system described herein, the most important of these auxiliary systems is the fuel handling system which is illustrated in detail in FIG. 2 of the drawings. In this arrangement, the operations performed within the fuel handling system are divided into four major categories of slurry storage, vehicular deuterium oxide storage, concentration and dilution of the slurry, and transfer of slurry or vehicle into and out of the primary system.

In this arrangement the fuel handling system comprises, inter alia, twenty drain tanks 52', although only five of these tanks are illustrated in FIG. 2. For purposes of exemplifying the invention the drain tanks 52' are grouped into three functional categories in which a single drain tank 52'A serves as a slurry aaccumulator tank. A total of six drain tanks 52'B serve as storage for concentrated slurry and the remaining thirteen tanks 52'C serve as a repository for the slurry normally circulated through the reactor vessel 20 and the primary coolant loops 25. The latter group of tanks 52'C are capable of containing the entire contents of the primary reactor system or about 19,000 gallons and are normally empty during reactor operation in the event the reactor system must be shut down under emergency conditions or for purposes of maintenance or other contingency. The aforementioned drain tank groupings together with the common header conduits 96, 110, 144, and 182 are sometimes hereinafter referred to as the "drain tank complex."

Each of these storage tanks 52' is provided with a stirring mechanism 59, which has been described previously in connection with FIG. 1 of the drawings. As indicated heretofore none of the generally vertical drain tanks 52' contains sufficient volume to provide a critical mass of the fissile material contained therewithin. Moreover, the twenty drain tanks 52' are arranged in a separated or spaced array and desirably are provided with neutron absorbing material therebetween in order to prevent a critical mass from being formed collectively among the drain tanks 52'. A suitable spatial disposition of the drain tanks 52' is described in aforementioned U.S. Patent 3,113,915.

In this example, the drain tanks 52' are each approximately three feet in diameter and about thirty feet in height, which dimensions positively preclude criticality in the slurry contained within each tank under any conditions. Each tank is designed to withstand an operating pressure of 1500 p.s.i. For purposes elaborated upon subsequently, the concentrated slurry contained within the drain tanks 52'B in this example is approximately double the normal concentration of the slurry circulated through the primary reactor system.

The drain tank 52'A serves as aforesaid, as a slurry accumulator tank normally used to collect small volumes of slurry periodically discharged or "blown down" from various components of the reactor system for cleansing purposes. All the tanks 52' are coupled to a drain header or conduit 96 through individual valved conduits 98. The aforedescribed groupings 52'A, 52'B and 52'C of the drain tanks 52' are preserved by insertion of normally closed valves 100, 108 and 102 within the drain header 96.

The reactional vessel 20 is coupled to the drain header 96 by means of a conduit 54 connected to the outlet port 50 of the lower reactional vessel manifold 22 as described heretofore in connection with FIG. 1 of the drawings. To ensure quick and complete draining of each primary loop 25, the suction side of each primary pump 36 and the inlet of each steam generator 32 are connected through a branched conduit system 104 to the drain header 96. To control draining of the reactor system in this manner a pair of stop valves 106 are inserted in each branch of the conduit 104 and in the conduit 54. In this manner the reactioned vessel 20 and each of the four circulating loops 25 are coupled through the drain header 96, a normally opened valve 108 in the drain header 96, and the drain tank inlet conduits 98C to the thirteen slurry repository tanks 52'C.

By slidably opening one or more of the valves 100, 102, or 108 in the drain header conduit 96 the slurry accumulator tank 52'A in an emergency can be utilized either with the group of six concentrated slurry tanks 52,B or with the group of thirteen slurry repository tanks 52'C.

Thus, it will be seen that the drain header mainly serves to connect a total of nine points of drainage i.e., one at the reactor vessel 20 itself and two at each of the primary loops 25, from the primary reactor system to the drain tanks 52'. Among the auxiliary functions of the drain header 96 are transfer of deuterium oxide steam from a suitable evaporator (not shown) to the drain tanks 52' for heating and pressurizing the drain tanks 52' to prevent thermal shock upon contact by hot slurry drained from the primary reactor system, return of condensed deuterium oxide from a plurality of condensers 114 and 115 presently to be described to the drain tanks 52', and transfer of material from one drain tank to the drain header 96 or to another in the manner to be presently described.

Each of the twenty drain tanks 52' also is coupled to a liquid header or conduit 110 by means of individual valved conduits 112. If desired, a small portion of slurry can be drawn periodically from the drain tanks 52' and conducted by means of the liquid header conduit 110 and a conduit 116 to a chemical processing plant 118. At the processing plant 118 this portion of slurry is chemically processed to remove fissional products created during normal reactor operation. The reprocessed slurry of the chemical processing plant 118 can be conveyed to the primary reactor system by means of a slurry pump 318 and valved conduits 120 and 121. The conduits 120 and 121 conduct the reprocessed slurry to a battery of high head pumps, indicated generally by the reference characters 122, and thence to one of the circulating loops 25 by way of a valved conduit 124 and one of the branched conduits 104 described heretofore. When not being added to the primary reactor system in this fashion, the output of the chemical processing plant 118 can be conveyed by means of the slurry pump 318 through a suitable cooler 126, conduits 121 and 128, and a valve conduit 130 to the liquid header 110. Alternatively, as in this arrangement when the reactor is not in operation, the output of the chemical processing plant can be conveyed through the cooler 126 and conduit 128 as before, and through another valved conduit 132 to the slurry accumulator tank 52'A.

However, when filling the primary reactor system including the vessel 20 and associated circulating loops 25, slurry is withdrawn from the drain tanks 52' in the reverse direction through the valved conduit 130 or 132 or both, and through the cooler 126 and the associated conduit 128 by means of the aforesaid battery of high head pumps 122 and the conduits 120 and 124. As pointed out previously, the conduit 124 is coupled to one only of the circulating loops 25 through the associated one of the branched conduits 104. The liquid header 110 is provided with valves 134 and 136, which in conjunction with a valve 138 disposed in the conduit connection 112A of the slurry accumulator tank, determined which of the three groups of storage tanks 52'A, 52'B or 52'C are coupled to the suction side 140 of the high head pumps 122.

After the reactor system is filled, the primary function of the liquid header 110 is to provide for over-flow from one storage tank 52' to another in each group and to assure level equalization among the drain tanks in each group. The liquid header also is employed to transfer slurry vehicle, which in this case is deuterium oxide, to one or more of the drain tanks 52' for purposes of dilution or the like, to transfer slurry as subsequently described from one tank to another, or to convey slurry from one or more of the drain tanks to the chemical processing plant 118 in the manner described heretofore. The individual conduit connections 112 which couple the storage tanks 52' to the liquid header 110 extend to the bottom of each tank to permit almost complete liquid removal therefrom. These extensions of the conduits 112 are indicated by dashed lines 142.

After the slurry has been subjected to chain reaction within the reactional vessel 20 and subsequently stored in the drain tanks 52', the slurry will release a considerable amount of heat due to radioactive decay of the contained fission products. The decay heat is removed from the storage tanks 52' by condensation of that portion of the deuterium oxide vehicle which is vaporized by the decay heat. In furtherance of this purpose, each of the drain tanks 52' is coupled to a vapor header 144 through individual vapor conduit connections 146. That portion of the vapor header 144 which is coupled to the slurry repository tanks 52'C is isolated from the remainder of the vapor header 144 by a pair of stop valves 148. By the same token that portion of the vapor header coupled to the slurry accumulator tank 52'A can be isolated from the remainder of the vapor header 144, if desired, by means of a normally open valve 150.

More specifically, any heat developed in the slurry accumulator tank 52'A and in the six concentrated slurry tanks 52'B is removed by conveying the resultant deuterium oxide vapor from these tanks 52'A and 52'B through the associated valved conduit connections 146, the vapor header 144, and a valved inlet conduit 152, to a slurry entrainment separator 154. The slurry entrainment separator 154 is a conventional, centrifugal-type device and therefore will not be described in detail. The entrained liquid output of the entrainment separator is returned to the drain header 96 or to the liquid header 110 through a conduit 156 and valved conduits 158 and 160, respectively. Thus it is seen that the entrained slurry can be returned to the liquid header 110 and thence to one or more of the storage tanks 52'A or 52'B by opening an appropriate one of valves 162 or 164 of the aforesaid conduits 158 or 160.

The vapor from which any entrained slurry has been removed is then conveyed to an associated drain tank condenser 114 through a conduit 166. After being condensed the liquid deuterium oxide is conveyed from the condenser 114 through a valved outlet conduit 168 and the valved conduit 158 or 160 described heretofore to either the drain header 96 or the liquid header 110. A check valve 170 is disposed in the valved conduit 168 in order to prevent reverse flow of slurry from the entrainment separator 154 which slurry would tend to clog the heated portions of the condenser 114.

In a similar fashion the vapor removed from the slurry repository tanks 52′C and the associated portion of the vapor header 144 is conducted in parallel paths through valved conduits 171 to a pair of slurry entrainment separators 172. The effluent vapors of the slurry entrainment separators 172 are conducted to associated ones of the drain tank condensers 115. The outputs of the drain tank condensers 115 and of the slurry separators 172 are conveyed respectively through conduits 174 and 176 and one of the valved conduits 178 or 180 to either the drain header 96 or the liquid header 110, as desired. As stated heretofore the vapor generated in the repository tanks 52′C and conducted through the vapor header 114 is normally isolated from the balance of the vapor header 144 by means of the stop valves 148. Thus, it will be seen that two drain tank condensers 115 and associated components are reserved for use with the repository tanks 52′C while one condenser 114 and entrainment separator 154 are employed with the balance of the drain tanks. This arrangement is necessary due to the larger number of repository tanks 52′C and to the fact that these tankes normally are intially employed to store very hot slurry, which moreover contains a quantity of fission products as a result of having been subject to the fissional process within the reactor vessel 20. Alternatively, instead of employing the entrainment separators 154 and 172 for respective ones of the drain tank condensers 114 and 115, a flash section can be built into the vapor space in each drain tank and a suitable entrainment separator (not shown) can be included in this space thereby eliminating the external separators 154 and 172.

The storage tanks 52′ are provided in addition with a relief header, denoted by the reference character 182. The relief header 182 is connected to the individual storage tanks 52′ by means of conduits 184 containing relief valves 185 and coupled respectively to the vapor conduits 146 of each tank 52′. The relief header 182 is coupled to an input relief header 186 associated with the deuterium oxide storage tank condenser 188 presently to be described. Likewise, coupled to the input relief header 186 by means of suitable connections (not shown) are other components of the reactor system, as indicated by conduit segments 190. In order to satisfy the ASME code there are no valves in the relief headers 182 and 186 other than the relief valves 185.

Storage space for the slurry vehicle or in this case heavy water is provided by a plurality of storage tanks 192, with three being employed in this example. During normal operation of the reactor system thes tanks are approximately half full, whereas during a plant shutdown the tanks are completely full. A storage tank condenser 188 is coupled to a common storage tank outlet conduit 194 through a conduit 196. Any vapor formed in the storage tanks 192 is conducted to the overhead condenser 188 by means of an overhead conduit system 198. The outlet conduit 194 is coupled to the suctional side of the deuterium oxide pump 200 through a valved conduit 202. When supplying deuterium oxide vehicle to the chemical processing plant 118 for preparation of slurry, makeup purposes, or the like, the conduit 202 is coupled thereto through another valved conduit 204. By means of the pump 200 the vehicle stored within the tanks 192, for purposes noted hereinafter, can be supplied to the primary reactor system through a conduit 206 which is connected to the associated branched conduit 104 of one of the circulating loops 25. A check valve 208 is coupled in the conduit 206 in order to prevent reverse flow from the primary reactor system or from the high head slurry pumps 122.

With this arrangement the primary reactor system can be filled initially with deuterium oxide vehicle during the processes of starting up and shutting down, presently to be described.

Due to their auxiliary function as catch tanks for relief purposes the deuterium oxide storage tanks 192 must be limited to a maximum diameter of three feet in this example inasmuch as it is conceivable that the circulated fuel slurry could be conducted to these tanks by way of the input relief header 186 and storage tank condenser 188. As pointed out previously in connection with the drain tanks 52′, a tank of this diameter is positively incapable of containing a critical mass of the aforesaid fuel slurry. The storage tanks 192 also are employed as accumulators for liquid or vapor discharged from other components of the reactor plant either normally or during relief situations. Employment of these storage tanks 192 as relief volume is desirable inasmuch as their operating pressure is relatively low and ranges from about atmospheric to 100 p.s.i.a. The condenser 188 thus serves to limit the maximum pressure during a relief operation and also to remove radioactive decay heat by condensation of the attendant vapors, developed within any slurry that may be conducted to the deuterium oxide tanks 192.

The initial quantity of deuterium oxide or other slurry vehicle required for the reactor system is added to the storage tanks 192 from a primary storage system (not shown) by means of a conduit 210 which joins the overhead conduit system 198 of the storage tanks 192. Another conduit 212 is joined to the outlet side of the deuterium oxide pump 200, whereby a quantity of the deuterium oxide is supplied to a suitable gas handling system, such as that noted previously, where it serves as a diluent for the radioactive gaseous fission products conveyed through the latter-mentioned system. The latter portion of deuterium oxide can be supplied to an external evaporator (not shown) or one associated with the gas handling system, and the deuterium oxide steam not used in the gas handling system is returned through a conduit 214 to the storage tank condenser 188. The $D_2O$ storage tanks and associated components in addition are pressurized by the aforesaid evaporator to prevent vapor binding in the $D_2O$ pump 200.

Slurry concentration and dilution is performed in the drain tank complex or alternatively in the slurry concentrator 220 FIG. 2A, presently to be described. The operations of concentration and dilution are undertaken in order to facilitate starting up and shutting down the primary reactor system. Concentration in the drain tank complex is done by boiling and utilizes the radioactive decay heat of the slurry itself. The resultant vapor is condensed in the drain tank condensers 114 and 115 and is collected in the deuterium oxide storage tanks 192. In furtherance of the latter purpose valves 222 and 224 disposed in the outlet conduits 168 and 174, respectively, of the drain tank condensers 114 and 115 are closed; and the condensate, leaving the drain tank condensers 114 or 115, is conducted instead to the input relief header 186 and through the deuterium oxide storage tank condenser 188 through a valved conduit 230 and through conduit 226 or 228, respectively. With this arrangement in utilizing the decay heat as aforesaid the desired slurry concentration can be obtained in each group of tanks 52′B and 52′C.

As indicated heretofore, the concentration of slurry contained within the smaller group of drain tanks 52′B is about double that initially conveyed from the primary reactor system to the other group of tanks 52′C. When the concentration of slurry contained within the repository tanks 52′C is increased in the aforesaid manner to that desired for the concentrated slurry tanks 52′B, for example, the vapor pressure developed in the tanks 52′C can be employed to transfer the contents of the latter tanks to the other group or groups of tanks 52′B or 52′A depending upon the storage volume required. In furtherance of this purpose, valves 334 and 336 disposed in the drain and vapor conduits 98c and 146c of each repository tank 52′C are closed, whereupon the vapor resulting from decay heat of the slurry within these tanks tends to accumulate at the top thereof. At the same time a valve 341 in the extended connecting conduit 112c–142 of each tank 52′C and the valve 136 of the liquid header 110 are opened whereupon the increasing vapor pressure forces slurry from the tanks 52′C into the liquid header 110. At this point the other liquid header valve 134 can be opened; and by opening selected ones of valves 138 and 340 disposed in the connecting conduits 112a and 112b of the accumulator tank 52′A and of the concentrated slurry tanks 52′B, the slurry forced out of tanks 52′C can be deposited in one or more of the tanks 52′A and 52′B. Alternatively, valves 134 and 342 can be closed, and upon opening valves 320 and 344 in the conduits 130 and 132, respectively, the contents of the repository drain tanks 52′C, if relatively small in quantity, can be conveyed directly to the slurry accumulator tank 52′A in bypassing relationship with the concentrated slurry tanks 52′B. The accumulator tank 52′A is then isolated, as in normal operating conditions, from the concentrated slurry tanks 52′B by closing the valve 138 situated in the associated connecting conduit 112a. Alternatively, slurry can be transferred among the individual drain tanks 52′ of the drain tank complex by coupling selected ones of the tanks, from which material is to be removed, to the liquid header 110 by opening valves 134 and 136 when necessary and by opening associated ones of valves 138, 340 and 341 in the connecting conduits 112a, 112b and 112c, respectively. The slurry pumps 122 are then energized to draw material from the selected tank or tanks via the liquid header 110 and conduit 332 to the drain header 96, after opening valves 320, 342 and 333. The material then is deposited in selected ones of the tanks 52′ through one or more of the conduits 98a, 98b, and 98c upon opening appropriate ones of their individual valves 335, 337 and 334 respectively, and upon opening appropriate ones of the valves 100, 102 and 108 in the drain header 96. Still another method of transferring material among the tanks or removing material from the drain tank complex involves increasing the pressure of pressurizing $D_2O$ steam supplied to the drain header 96 through conduits 317 from an external evaporator (not shown) and opening appropriate ones of the aforesaid valves.

Dilution of the slurry in each group of tanks in the drain tank complex is accomplished by bypassing the pump 200 and withdrawing liquid deuterium oxide from the storage tanks 192 by gravity through conduits 202 and 306 to the liquid header 110. From this point the diluent deuterium oxide can be diverted to selected groups or individual ones of the drain tanks 52′ by suitable manipulation of valves 134, 136 and 138. Alternatively, liquid $D_2O$ can be removed from the tanks 192 by increasing the pressure of $D_2O$ steam supplied thereto through conduit 214.

In the event that sufficient decay heat is not available for concentrating the slurry in this fashion, a slurry concentrator 220 is coupled to the lower manifold 22 (FIG. 1) of the reactional vessel 20 through a valved conduit 238 and a second valved conduit 240. Thus during normal reactor operation a quantity of slurry can be supplied to the concentrator 220 upon opening valves 242 and 244 disposed respectively in the conduits 238 and 240. When, however, the primary reactor system is not in operation, the slurry can be drawn from the drain tanks 52′ through the connecting conduits 112, the liquid header 110, and associated conduits 130 and 128 by means of the high head pumps 122. A valve 246 in the outlet conduit 124 of the pumps 122 is closed in order to cause the slurry to flow through a valved connecting conduit 248 coupled between the outlet conduit 124 and the inlet conduit 240 of the slurry concentrator 220. Closing the valve 246, of course, causes the slurry to flow to the concentrator 220 in bypassing relation to the primary reactor system.

The slurry concentrator 220 in this arrangement comprises a battery of hydroclones (not shown), or the like, which are designed for high pressure operation. The hydroclone arrangement, or other centrifugal or separating device, separates the slurry into dilute and concentrated fractions, which exit from the concentrator 220 through the conduits 250 and 252, respectively. Upon opening valve 251 in conduit 250 and closing valve 253 in the return conduit 300, the dilute slurry stream is conducted through a suitable cooler 254 to prevent flashing of the dilute and concentrated slurry streams in the depressurizing or letdown devices, presently to be described. Similarly the concentrated slurry stream is conveyed through cooler 256 by opening valves 255 and 257 in the conduit 252 and by closing valves 259 and 261 in conduits 296 and 298, respectively. The coolers 254 and 256 comprise, for example, ordinary heat exchangers which are designed for the operating pressures of the reactor system and are cooled by cooling water supplied thereto by means of conduits 258 and 260.

From the cooler 256 the concentrated slurry stream, which is about double the normal slurry concentration of the primary system, is conveyed through a slurry letdown device indicated generally by the reference character 262. The letdown device 262 consists of relatively small diameter tubing desirably inserted in a suitable cooling medium (not shown) to prevent flashing of the concentrated slurry in the event that the slurry is not sufficiently cooled in the cooler 256, and having sufficient length to induce the desired pressure drop. At this point the concentrated slurry is added to the drain header 96 and thence to the drain tanks 52′ through a valved conduit 264, after the pressure of the slurry has been reduced by the letdown device 262 from the reactor operating pressure of 2000 p.s.i. to about 600 p.s.i. or the operating pressure of the drain tanks 52′. A check valve 266 is coupled in the drain header 96 between the conduit 264 and the remainder of the components connected to the drain header in order to prevent reverse flow from the drain header to the letdown device and associated components.

A small portion of the slurry concentrated in this fashion is periodically withdrawn from the outlet stream of the letdown device 262 through a valved conduit 267. The latter conduit 267 couples the concentrated letdown device to a slurry measuring tank 268. With the measuring tank 268 the amount of concentrated slurry, which periodically is extracted from the primary reactor system and is conducted to the chemical processing plant 118 through valved conduit 270, can be proportioned precisely. Any part of the contents of the slurry measuring tank 268 which is not conducted to the chemical processing plant are conveyed to the drain header 96 by means of a valved conduit 272.

The dilute slurry stream issuing from the concentrator 220 is conducted after passing through the cooler 254 to a depressurizing or letdown device indicated generally by the reference character 274. The letdown device 274 is similar in structural detail to the concentrated slurry letdown device 262 and accordingly a further description is dispensed with. A relatively small portion of the output of the letdown device 274 in this arrangement is conveyed to an evaporator 276 through a valved conduit 278. The remainder of the diluted output is conveyed to the $D_2O$ storage tank 192 through a valved conduit 322. In the evaporator 276, a portion of the slurry vehicle, or deuterium oxide in this case, is vaporized by means of process steam ($H_2O$) supplied to heating coil 280. The remaining slurry, after a portion of the vehicle is removed, is conveyed from the bottom or outlet of the evaporator 276 through a valved conduit 282 to the slurry accumulator tank 52′A. The vapor generated within the evaporator 276 is conveyed to a purge condenser 284. In the purge condenser 284 the vaporous vehicle is condensed to form liquid deuterium oxide which is used for purging various components of the reactor system in order to prevent accumulation or settling out of slurry particles therein. The purging liquid is supplied to the aforesaid components, as indicated partially by terminal conduits 286, by means of a high head purging pump 288. The purging liquid first is conducted through a cooler 290 in order to prevent vapor binding in the high head pump 288. A check valve 292 is disposed in a conduit 294 between the cooler 290 and the pump 288 in order to prevent reverse flow in the event of pump failure. The purging system just described in this example serves desirably as an auxiliary purging system for use during reactor shut-down or other contingency. During normal reactor operation, purging liquid is supplied from a fissional gas handling system usually associated with the reactor plant, such as one of the gas-handling systems disclosed and claimed and the aforementioned copending applications of D. F. Rinald and of J. Weisman et al.

In the event that it is not desired to separate the slurry into light and heavy fractions by means of the concentrator 220, the concentrator can be bypassed through the conduits 296 and 252 by opening valves 257 and 259 and closing valves 255 and 261. Slurry can then be supplied directly from the primary reactor system to the cooler 256 and concentrated slurry letdown device 262 for depressurizing in the manner described heretofore and conveyance for instance to the chemical processing plant 118 via the slurry measuring tank 268. The heavy or dilute fractions issuing from the concentrator 220 can be returned to the primary reactor system, for purposes of starting up or shutting down the reactor as explained more fully hereinafter, by means of valved conduits 298 and 300, with the former conduit being coupled to the suctional side of one of the primary loop pumps 36. The valved conduits 298 and 300 are coupled individually to the outlet conduits 250 and 252 of the slurry concentrator 220, and a check valve 302 or 304 is connected in each of the conduits 298 and 300 in order to prevent reverse flow from the primary reactor system to the slurry concentrator 220 or to the slurry coolers 254 and 256. With this arrangement, then, dilute slurry or slurry vehicle can be returned to the primary reactor system in shutting down the reactor by closing valves 251 and 261 and by opening valves 253 and 303 in conduits 300 and 298 respectively. Similarly concentrated slurry can be returned, during start-up by opening valves 255, 261 and 303 and by closing valves 253 and 257. In this arrangement, the conduit 298 is coupled to the suction side of one of the circulating pumps 36 to supply the necessary motive force in returning the dilute or heavy fractions to the primary reactor system. However, an auxiliary pump can be coupled in the conduit 298, if desired. The rate of return of either the light or heavy fraction is adjusted by suitable setting of the valves 253 or 261, respectively. Motive force for the light or heavy fraction being depressurized is provided, of course, by th pressure drop across the letdown device 274 or 262.

The normal process of transferring material into or out of the primary reactor system is accomplished by means of the D₂O storage tank pump 200 and the high head slurry pumps 122, in conjunction with the slurry concentrator 220. The D₂O storage tank pump 200 is provided in order initially to fill the primary reactor system during start-up with heavy water at a relatively high rate and low pressure of about 150 p.s.i.a., while the high head slurry pumps 122 are employed to transfer concentrated slurry from the drain tanks 52′B to the primary reactor system at a considerably lower rate. The concentrated slurry is added at about 2000 p.s.i.a., to which pressure, the initial D₂O fill is raised by operating the pressurizing vessel 64. At the same time, the slurry withdrawn from the primary reactor system through the conduit 238 (FIG. 2B) is fed through the slurry concentrator 220, and a selected one of the light and heavy fractions of the slurry concentrator output is returned respectively through the conduits 300 and 298 from the concentrator conduit 250 or through the conduit 298 from the other concentrator outlet conduit 252, as the case may be, to the primary reactor system.

As will be described presently in greater detail, the aforementioned light fraction is fed back into the primary reactor system when it is desired to dilute gradually the circulated fuel slurry in order to shut-down the reactor in the normal manner. At this time the high head pumps 122 are employed to pump D₂O or very dilute slurry from the storage tanks 192 to the primary system through conduits 202, 306, 130, 128 and 120. On the other hand, the aforesaid heavy fraction is fed back to the primary system in order to increase gradually the concentration of the circulated slurry when starting-up the reactor. However, during an emergency the entire contents of the primary reactor system may be transferred to the drain tanks 52′ rapidly, in this example in about fifteen minutes, simply by opening the nine pairs of drain valves 106, three pairs of which are shown in FIG. 2B. This emergency drainage procedure is avoided if at all possible, because of the high thermal stresses and the erosional damage induced in the drain tank complex and associated components of the system, when contacted suddenly by the large volume of heated slurry from the primary reactor system. During normal reactor operation this problem is not encountered because only relatively small volumes of slurry are removed from the primary reactor system by means of the slurry concentrator 220 and the dilute and concentrated slurry letdown devices 274 and 262, respectively.

In the course of normal reactor operation, approximately 47 gallons of the circulated slurry are removed daily, in this example, and conveyed to the chemical processing plant 118 for removal of fissional products and other accumulated impurities. This quantity of slurry is selected for processing on the basis that the entire contents of the primary reactor system, or about 19,000 gallons will be reprocessed over a 400-day cycle. As indicated previously, the quantity of slurry thus extracted each day is determined through use of the measuring tank 268. The primary reactor system is replenished with an equal volume of fresh slurry from either the concentrated drain tanks 52′B or from the slurry preparation facilities (not shown) of the chemical processing plant 118.

When starting up the aforedescribed reactor system, the primary system is initially filled by means of a so-called "push-pull" method. In brief, this procedure consists of filling the reactor vessel 20 and the four associated primary circulating loops 25 with a slurry vehicle such as liquid deuterium oxide, supplying an over-pressure by means of the pressurizer 64 described heretofore in connection with FIG. 1 of the drawings so that the primary pumps 36 can be started, and finally adding a slurry of double the final concentration from the drain tanks 52′B while at the same time extracting dilute slurry by means of the concentrator 220 until the desired operating concentration of the reactor is attained. In the following tables I and II the deuterium oxide requirements and the capacity of the several systems and sub-systems illustrated in FIG. 2 of the drawings are given:

TABLE I

D₂O *requirements*

|  | Volume at 60° F., gal. | Weight, lbs. |
| --- | --- | --- |
| Primary Reactor System | 19,100 | 176,700 |
| D₂O Slurry Preparation | 7,150 | 66,100 |
| Minimum for Auxiliary Equipment (approx.) | 1,500 | 13,900 |
| Excess for Auxiliary Equipment and Reserve Slurry | 900 | 8,300 |
| Total | 28,650 | 265,000 |

TABLE II

*Various system and sub-system capacities*

| | Gal. |
|---|---|
| Primary reactor system | 19,100 |
| D₂O storage tanks (192) | 21,400 |
| Drain or repository side of drain tank complex (52′C) | 19,100 |
| Concentrated slurry side of drain tank complex (52′A and 52′B) | 10,300 |
| Auxiliary equipment | 2,000 |

From the preceding tables, it will be seen that the initial deuterium oxide requirement totals 28,650 gallons, in this exemplary arrangement. The heavy water is fed into the D₂O storage tanks 192 from which 5,650 gallons are withdrawn to four of the slurry repository tanks 52′C by gravity flow through the outlet conduits 194 and 202 of the D₂O storage tanks 192 and a valved conduit 306 coupling the last-mentioned conduit 202 to the liquid header 110 of the drain tank complex. A check valve 308 is disposed in the connecting conduit 306 to prevent reverse flow through the conduit 306 from the liquid header 110 and the drain tank complex. The aforementioned 5,650 gallons are withdrawn, of course, as the D₂O storage tanks 192 are being filled, inasmuch as the total volume of the storage tanks 192 in this example, is less than the initial D₂O requirements. An additional 1,600 gallons are sent by means of the D₂O storage pump 200 and conduit 212 to the evaporator (not shown) employed for example in one of the aforementioned gas handling systems. The latter quantity of D₂O initially supplies operating purging liquid until the gas handling system attains normal operating conditions.

Prior to adding slurry to the reactor system, it is necessary to obtain a supply of purging water, as aforesaid. As an alternative supply of purging water, a portion of the heavy water contained within the storage tanks 192 is transferred by gravity to the evaporator 276 described heretofore by means of a valved conduit 310. In the evaporator 276 the heavy water is vaporized and subsequently condensed in the purge condenser 284 as described heretofore in connection with the dilute slurry fraction vehicle. The D₂O withdrawn from the storage tanks 192, is conducted first to the evaporator 276 in order to remove from the purge water any slurry particles which may have accumulated in the storage tanks. From the condenser 284 the heavy water is conducted through the cooler 290 and supplied to the suction side of the high head pump 288 for purging purposes. From the pump 288 the condensed purge liquid is carried to a purge storage tank 312 through an outlet conduit 314. In the purge storage tank 312 a pressure in excess of the reactor operating pressure of 2,000 p.s.i.a. is maintained by means of a helium or another inert gaseous atmosphere supplied from a suitable pressurized source (not shown). At this point, high pressure water is now available to a purge header 316 which is coupled to those components of the reactor system which require purging, for example, the pumps and the entrainment separators as indicated by the partial conduits 286.

After a supply of purging water is made available, approximately 7,250 gallons of heavy water are transferred to the chemical processing plant 118 for preparing the concentrated slurry which is employed as explained hereinafter for filling the primary reactor system. In order to obtain the last-mentioned quantity of heavy water, the 5,650 gallons already present in four of the drain tanks 52′C plus the steam condensed during pressurization of the D₂O storage tanks and the drain tanks are supplemented by heavy water from the D₂O storage tanks 192. The pressurizing steam is supplied to the drain tanks 52′ from the drain header 96 via conduit 317, and to the storage tanks 192 through the conduit 214 from a suitable evaporator (not shown). However, at least 19,100 gallons must be left in the storage tanks 192 for initially filling the primary reactor system with the slurry vehicle. The slurry is then returned from the processing plant 118 by means of the transfer pump 318 coupled in the outlet conduit 121 of the slurry or chemical processing plant. From the pump 318, the concentrated slurry is conducted to the liquid header 110 through the conduits 128 and 130 after opening valves 320 and 342. The valve 136 of the liquid header is then closed and the valve 134 thereof opened with the result that the concentrated slurry is conducted into the concentrated slurry tanks 52′B through the individual conduits 112B. At this time the slurry accumulator tank 52′A is isolated from the liquid header 110 by closing its associated valve 138.

The primary reactor system including the reactor 20 and associated circulating loops 25 is now filled with the 19,100 gallons of deuterium oxide or other slurry vehicle contained in the D₂O storage tanks 192, by means of the D₂O storage pump 200. Subsequently, the pressurizing vessel is charged with deuterium oxide from a high pressure D₂O storage tank (not shown) via conduit 321. The heaters 70 of the pressurizing vessel 64 are then energized to induce an initial pressure of several hundred pounds per square inch within the primary reactor system or a pressure sufficient to prevent vapor binding in the circulating pumps 36. The full system pressure of 2,000 p.s.i.a. should not be applied to the primary system until a temperature of at least 200° F. is attained in order to avoid the tendency of the structural steels to fracture due to brittleness at relatively low temperatures. For the same reason, no slurry or circulating fuel is permitted in the primary reactor system until the aforesaid 200° F. temperature level is reached. This precludes the possibility of a sudden pressure surge or positive system transient before the minimum temperature mentioned above is attained.

Accordingly, it is necessary to supply external heat to the primary reactor system before adding any slurry thereto inasmuch as the initial reactor filling of deuterium oxide is added substantially at room temperature. In order to avoid excessive thermal stresses in the heavy walls of the reactional vessel 20, a heating rate of 50° F. per hour is employed. One arrangement for supplying the necessary heat consists of filling the reactor system with relatively cold deuterium oxide or other slurry vehicle, operating the primary pumps 36, and thus adding heat as pump work. Alternatively, or in conjunction therewith, heat can be added to the primary system through the steam generators 32 by means of process (H₂O) steam supplied to the steam side of one or more of the steam generators from an external boiler arrangement (not shown).

Before slurry can be introduced into the primary reactor system from the concentrated slurry drain tanks 52′B, the repository drain tanks 52′C must be prepared as a safety precaution, for the possibility of an emergency drain. In furtherance of this purpose the tanks of 52′C are maintained at 250° F. or greater at all times. This is accomplished by emptying the drain tanks 52′C and continuously heating them with 100 p.s.i.a. D₂O steam supplied to these tanks through the conduit 317 (FIG. 2B) from an external evaporator, as aforesaid. To heat the tanks 52′C from room temperature or 60° F. to 250° F. requires the heat equivalent of approximately 15,000 pounds of D₂O vapor and the capacity of the external evaporator is such that this amount can be generated in fifteen minutes. However, when thermal equilibrium is once obtained, D₂O vapor is condensed at the rate of only 120 pounds per hour in maintaining a temperature of 250° F. in the entire group of the thirteen repository tanks 52′C. Additionally, the tanks 52′C should be isolated from other portions of the reactor system so that these other portions will not be subjected to thermal stresses induced by drainage of hot slurry from the primary reactor system into the repository tanks 52′C. Moreover, the drain tanks 52′B should likewise be isolated at this time to avoid diluting the concentrated slurry contained therein.

Slurry is now transferred from the concentrated slurry tanks 52′B to the primary reactor system by means of the high head pumps 122. As the concentrated slurry is added to the primary reactor system, an equivalent amount of the initial deuterium oxide filling is removed from the primary system and this is continued until the desired slurry concentration is obtained. Removal of the initial deuterium oxide filling is accomplished by means of the slurry concentrator 220 which is designed to withstand an operating pressure in the neighborhood of 2,500 p.s.ia. More specifically, as the concentrated slurry is added to the primary reactor system from the drain tanks 52′B through conduits 112B, the liquid header 110, the high head pumps 122, and the conduit 124, a similar quantity of liquid is extracted from the reactor system by opening valves 242 and 244 in the conduits 238 and 240, respectively, whereupon a quantity of the initial filling is conducted to the slurry concentrator 220. The heavy or concentrated fraction of the slurry concentrator output is returned to the suctional side of one of the primary pumps 36 through the conduits 252 and 298 upon opening appropriate valves therein. The light or dilute output of the slurry concentrator 220 at this time is conducted to the cooler 254 and the dilute slurry letdown device 274, and thence is returned to the $D_2O$ storage tanks 192 through the storage tank conduit 198 and a valved conduit 322. It will be seen from this arrangement that no additional pump is required for conveying fluid from the primary system to the slurry concentrator 220 inasmuch as one of the primary pumps 36 supplies the driving head.

For a normal shutdown operation the flow paths of the light and heavy fractions issuing from the slurry concentrator 220 are reversed such that the heavy fraction is conveyed to the drain tanks 52′ by means of the cooler 256, the concentrated slurry letdown device 262, and the drain header 96. On the other hand, the light fraction of the slurry concentrator 22 is conveyed through conduits 250, 300 and 298 to the suctional side of one of the primary pumps 36. In this manner, the concentration of the slurry circulating through the primary reactor system is diluted gradually until the reactor becomes sub-critical. Of course as slurry is conveyed to the slurry concentrator 220, during the shutting down procedure, an equivalent amount of deuterium oxide or other vehicle is added as a diluent to the primary system from the $D_2O$ storage tanks 192 by means of conduits 202, 306, 130, 128 and 120, and the high head pumps 122.

Figure 3:
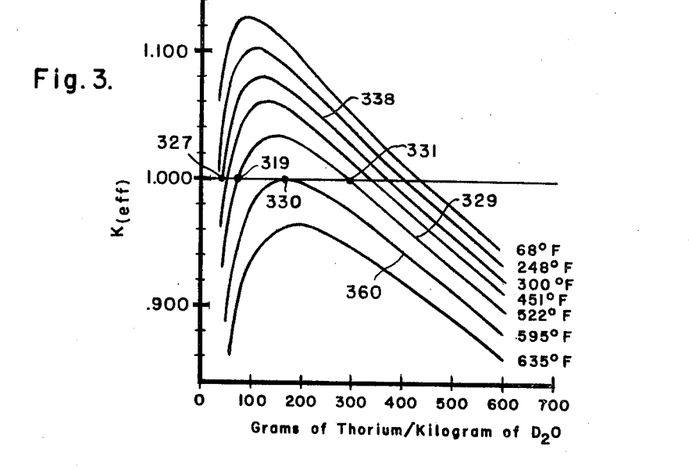
FIG. 3 is a graph showing a series of temperature curves of the effective neutronic multiplication constant plotted against slurry concentration.

During start-up of the reactor, slurry is fed to the primary reactor system at a concentration of approximately 600 grams of thorium oxide and uranium oxide per kilogram of $D_2O$ and at a rate of 30 gallons per minute or less until criticality is reached. During the time in which concentrated slurry is added in this fashion the liquid level in the pressurizing vessel 64 is maintained constant by controlling the rate of diluted slurry passing through the letdown device 274. The average temperature in the primary system during this portion of the filling operation has risen to approximately 300° F. so that criticality is obtained in the reactor vessel 20 at an average slurry concentration of about 40 grams per kilogram of $D_2O$ as shown at point 327 on curve 338 in FIG. 3 of the drawings. At this point of course, the effective coefficient of critically ($k_{eff}$) is equal to unity. The slurry must thereafter be introduced at a reduced rate not only to avoid large inputs of reactivity to the reactor system but also to limit the rate of temperature rise to 50° F. per hour and to maintain ($k_{eff}\dot{=}1$). The addition of concentrated slurry is continued until the operating temperature of 522° F., at substantially zero power level is reached. This point is designated as the low critical concentration and occurs in this arrangement at a slurry concentration of about 70 grams per kilogram of $D_2O$ as shown by point 319 on curve 329.

At the aforedescribed low critical concentration the reactor desirably is operated at a substantial percentage of rated power output in accordance with the method described and claimed in the aforesaid copending application of W. A. Frederick as pointed out previously. Alternatively, an external reactor poison can be added at this time to cause the reactor to become subcritical while the concentration of the fuel is being increased to the high critical concentration. On the other hand, the use of the aforementioned poison can be eliminated altogether and the reactor system can be designed to withstand higher peak temperatures and attendant pressures so that the temperature of the circulating slurry can be permitted to rise sufficiently to shut down the reactor at the low critical concentration before adding additional fuel to the slurry. This is accomplished for example by withdrawing only enough steam from the steam generators 32 by suitably adjusting the valves 324 in their outlet conduits 37 so that the average temperature within the reactional vessel 20 reaches at least 595° at which temperature the reactor will remain subcritical, in the arrangement described herein for that range of concentrations between the high and low critical points as indicated by peak 330 of temperature curve 360 illustrated in FIG. 3 of the drawings. It will also be seen from FIG. 3 that this maximum temperature is obtained as the concentration is increased from the low critical concentration of 70 grams per kilogram of deuterium oxide to only about 170 grams per kilogram of deuterium oxide. Thus, by removing only a small proportion of power in the form of heat from the primary system a resultant temperature rise prevents the reactor from becoming critical as the concentration is increased. The resultant expansion of the $D_2O$ vehicle-moderator is illustrated in the following Table III, which expansion results in a negative coefficient of reactivity as explained previously:

TABLE III $D_2O$ volume expansion due to temperature increase

| | Percent |
|---|---|
| 60° F. to 120° F. | 1.8 |
| 60° F. to 300° F. | 9.3 |
| 60° F. to 522° F. | 33.8 |
| 120° F. to 522° F. | 31.4 |
| 300° F. to 522° F. | 22.8 |

As soon as the reactor becomes subcritical, heat removal via the steam generators 32 is determined substantially to aid in preventing the reactor from again reaching criticality while the concentration of the fuel is being increased to the operating or high critical concentration. If the reactor is operated for a time at the low critical point, the limited amount of subsequent fissions plus the decay heat involved by fissional products generated during the period of criticality will maintain the temperature of the reactor system at or above the aforementioned temperature of 595° until the concentration can be increased to the high critical concentration.

Figure 4:
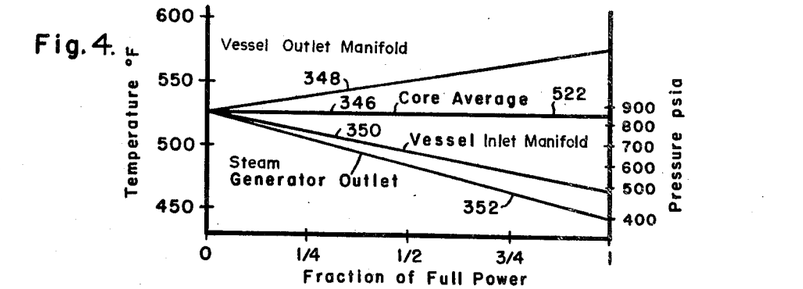
FIG. 4 is a graphical representation of slurry and steam temperatures of the reactor system described herein, as functions of reactor power output.

After the average reactor temperature of 522° F. has been obtained, which is the operating temperature in this case, the temperature is then maintained constant by extracting power in the form of heat from the primary reactor system by means of the steam generators 32. Withdrawing power, of course, increases the temperature drop across the reactional vessel 20, as illustrated in FIG. 4 of the drawings, while the average temperature of the vessel remains constant as shown by line 346. However, the slurry temperature at the vessel outlet manifold 24 (FIG. 1) rises linearly, line 348, with power level until approximately 580° F. is attained at full power operation; and the slurry is supplied to the steam generators 32 at substantially the outlet manifold temperature. On the other hand, the slurry temperature at the inlet manifold 22 (FIG. 1) decreases linearly with increased reactor power output, line 350, to about 465° F. at full reactor power. The temperature of steam issuing from the steam generators 32 decreases linearly with the quantity of steam utilized as shown by line 352; thus, the temperature of the steam likewise decreases linearly with increased reactor power, to about 445° F. at rated power output.

The process of shutting down the reactor system under normal conditions, for example during inspection or maintenance of equipment, requires essentially the reverse of the steps employed in the aforedescribed starting up procedure. Initially the heat withdrawn from the reactor is reduced substantially so that the resulting increase of temperature will render the reactor subcritical. The reactor then is maintained in a subcritical condition by one of the methods outlined previously while the slurry concentration is decreased from the high critical concentration to the low concentration.

The slurry concentration is reduced by pumping in $D_2O$ vehicle at the rate of 30 gallons per minute and by utilizing the slurry concentrator 220 to return the light or dilute slurry fraction to the primary reactor system through conduits 300 and 298 and to conduct the heavy or concentrated fraction through the slurry letdown device 262 for storage in the drain tank complex. In furtherance of this purpose, dilute slurry or slurry vehicle, as the case may be, from the $D_2O$ storage tanks 192 is fed into the primary reactor system by means of the high head pumps 122 and associated conduits. The concentration of slurry within the primary system should be reduced as far as practical in order that flushing of the primary system is not required subsequent to the normal draining procedure. Obviously, the dilution process can be terminated or suspended temporarily at the low critical concentration if it is desired to operate the reactor to sustain a chain reaction at the low critical concentration. This latter procedure is efficaceous, for example, in maximizing burn-up in a given quantity of slurry, in obtaining fissional products for industrial purposes, or the like. Following operation at the low critical concentration, if used, the chain reaction can be terminated simply by reducing the concentration of the slurry, as indicated by the isothermal curves of FIG. 3.

The slurry initially removed from the primary system by the slurry concentrator 220 is approximately double the normal concentration and as the concentration in the primary system decreases so will that of the concentrated output of the slurry concentrator 220. The heavy fraction of the slurry concentrator output is stored in the concentrated slurry tanks 52'B to which the heavy fraction is conveyed by means of conduits 252, 264, and 96 and associated components as described previously. However, after the heavy fraction of the slurry concentrator 220 has decreased substantially below double the normal reactor concentration, the slurry then is reconcentrated by conducting it from the drain tanks 52'B to the concentrator 220 and returning only the heavy fraction to the drain tanks 52'B. This is accomplished by conveying the slurry through the liquid header 110, conduits 130 and 128, pump bypassing conduit 354, conduit 124, and primary reactor system bypassing conduit 248 to the slurry concentrator inlet conduit 240. Then the heavy fraction is returned via the concentrated slurry letdown device 262. The necessary driving force is furnished by heat of radioactive decay, or if the latter is insufficient by an over pressure supplied from the aforesaid external evaporation through conduits 317.

Alternatively, inasmuch as release of radioactive decay heat within the slurry stored in the drain tanks 52'B will result in removal of excess slurry vehicle by vaporization, the slurry can be permitted to increase to the desired consistency without removal from the drain tanks 52'B. The vapors thus removed from the drain tanks are condensed in the drain tank condensers 114 and 115 as described heretofore and the resultant liquid desirably is conveyed through the conduits 226, 228 and 230 to the $D_2O$ storage tanks 192. After the slurry has been concentrated to approximately double the normal concentration within the drain tanks 52'B and the concentration of slurry within the primary system has been reduced to a corresponding concentration of about 30 grams per kilogram of $D_2O$, the pairs of drain valves 106 are opened in the conduits 54 and 104, and the slurry is conveyed to the repository tanks 52'C via the drain header 96 and associated conduits. This low concentration is selected in order to reduce erosion of the drain valves 106 insofar as practical. More particularly, this concentration is selected because the slurry cannot be criticalized at any temperature at this concentration, as would be indicated by extrapolation of the temperature curves of FIG. 3.

During the shutdown procedure decay heat is removed at a lower controlled rate from the primary system during the slurry dilution process by reducing the water level at the steam side of the steam generators 32. Preheated feed water is employed for this purpose as in the case of starting up the reactor to prevent thermal shock, and the resultant steam is condensed in the turbine condenser (not shown) or the like. When the slurry concentration has been reduced in the primary system such that the average system temperature is in the neighborhood of 250° F., heat removal by means of the steam generators should be terminated in order that the primary system will be maintained at this temperature by the aforesaid heat of radioactive decay. At this temperature the reactor can be restarted conveniently without imminent danger of thermal shock. Moreover, the drain tank complex desirably is maintained at this temperature, as described heretofore in connection with the start-up procedure, so that in the event of emergency drain the heated slurry conducted to the drain tanks 52'C will not subject these tanks to undue thermal stresses.

When the slurry concentration has been reduced to a sufficiently low level that substantially no slurry particles will settle out in the primary system, the primary pumps 36 are shut down, the heaters 70 of the pressurizing vessel 64 are deenergized, and the nine pairs of drain valves 106 are opened, whereupon the contents of the primary system are emptied into the drain tanks 52'C. In this manner, thermal shock in the drain tank complex will be practically nil and erosional damage to the drain valves 106 will be minimized or eliminated altogether. The pressure in the drain tanks 52' resulting from decay heat is controlled by varying the cooling water flow to the drain tank condensers 114 and 115. The maximum pressure of the drain tanks, is arbitrarily set at 600 p.s.i.a. although the tanks are designed for 1500 p.s.i. This safety factor is desirable inasmuch as available cooling water may be inadequate during an emergency drain.

As indicated heretofore, the slurry concentration in each group of drain tanks 52'B and 52'C is controlled by simply changing the flow path of the condensed $D_2O$ vapor from the drain tank condensers 114 and 115. In furtherance of this purpose, a suitable concentration measuring device (not shown) is associated with each of the drain tanks 52'.

When restarting the reactor the very dilute slurry contained in the drain tank 52'C is forced back into the primary reactor system by suitable means. The very dilute slurry is withdrawn from the repository drain tanks 52'C through the liquid header 110 and associated connecting conduits 112c and thence through conduits 130, 128 and 124 to one of the circulating loops 25. In this example, the high head pumps 122 are of relatively low volumetric capacity, and therefore, are not employed for initially filling the reactional vessel 20 and associated circulating loops 25. For this reason, the high head pumps are bypassed with a valved conduit 354, inasmuch as the initial reactor filling of very dilute slurry is incapable of supporting a chain reaction and can be introduced at a rapid rate to save time in the restarting procedure.

In one arrangement the driving force required to transfer the dilute slurry from the drain tank complex to the primary reactor system is supplied by means of an overpressure applied in the form of $D_2O$ steam from the aforementioned external evaporator. The pressurizing $D_2O$ steam is conveyed to the drain tanks 52'C via the conduit 317, the drain header 96, and associated connecting conduits 98c, after opening appropriate valves. The increased steam pressure, of course, forces the liquid contained within the drain tank 52'C through the conduits 112c, which extend as aforesaid to bottoms of the tanks, and into the liquid header 110.

In another arrangement the driving force is supplied by heat of radioactive decay of the slurry contained within the concentrated slurry tanks 52'B. Since such material usually is relatively concentrated and contains, after a period of circulation through the reactional vessel 20, a quantity of fissional products, a considerable amount of $D_2O$ vapor is evolved from the tanks 52'B by the decay heat of these products. To employ this vapor to force the contents of the repository drain tanks 52'C back into the primary reactor system, valves 356 and 358 are closed in the conduits 152 and 171 connecting the entrainment separators 154 and 172 and drain tank condensers 114 and 115, respectively, with the vapor header 144. At the same time, the valves 148 of the vapor header are opened, and likewise valve 150, if there is an appreciable quantity of slurry in the slurry accumulator tank 52'A tanks. The vapor issuing from 52'B, and 52'A if any, is then conveyed through the vapor header 144 to the repository drain tanks 52'C, via their individual connecting conduits 146c after opening valves 336 therein. In this manner the vapor pressure built up in the concentrated slurry tanks 52'B is applied to the top surfaces of the slurry contained within the dilute or repository drain tanks 52'C. As a result the dilute slurry is forced downwardly and out of the drain tank 52'C through the connecting conduits 112c and their extensions 142 to the liquid header 110. The valve 134 in the liquid header having been closed, the dilute slurry then is caused to flow through the conduits 130 and 128, the pump bypassing conduit 354, and the conduit 124 to the primary reactor system. Inasmuch as the concentration of the slurry contained within the repository tanks 52'C is incapable of sustaining a chain reaction, the primary system can be completely filled with this dilute slurry as an initial step in restarting the reactor. Thereafter, the concentration of the slurry is increased in the manner described heretofore in connection with initially starting the reactor. This arrangement also leaves the tanks 52'C empty in the event of any contingency or emergency during starting up or subsequent operation of the reactor.

An emergency drain procedure is followed in the event of equipment leakage or failure in the primary reactor system. A rapid drainage of the reactor system obviates such conditions as extensive contamination of the vapor container (not shown) surrounding the reactor plant, considerable loss of slurry and heavy water or other slurry vehicle, and caking of slurry in the primary system due to failure of the primary pumps or the like. As shown in FIG. 2 of the drawings the primary reactor system has a total of nine drain connections with one connection 50 being made at the lower or inlet manifold of the reactor vessel 20 (FIG. 1) and two connections being made at each of the circulating loops 25. As described heretofore, each of these connections is coupled through conduits 54 or 104 in each of which are disposed a pair of stop valves 106. This drainage system permits complete drainage from the lowest points of the entire primary reactor system. In this example, the entire contents of the primary system can be drained in approximately fifteen minutes.

If a maximum of radioactive decay heat is produced when the slurry is drained in this fashion to the drain tanks 52', heat will be generated therein for a limited length of time at a greater rate than it can be removed by the drain tank condensers 114 and 115. During the emergency drain and for a short period thereafter, the temperature and pressure of the slurry in the drain tanks will rise to a maximum of about 545° F. and 1000 p.s.i.a., in this arrangement.

The drain valves 106 can be operated manually, if desired; or alternatively, these valves can be operated automatically by suitable mechanisms (not shown), which mechanisms are actuated in turn by a hazardous abnormal condition such as an excessively high pressure in the primary system, detection of radiation in the steam leaving one of the steam generators 32, loss of power to the primary circulating pumps 36, leakage from the primary reactor system to the aforesaid vapor container, or the like.

From the foregoing description it will be apparent that a novel and efficient reactor system has been described herein. Although the invention has been described in connection with a particular type of homogeneous reactor, it will be apparent that the invention can be adapted readily to other types of homogeneous reactors and related reactor systems. The foregoing descriptive and illustrative materials therefore are intended to exemplify the invention and should not be interpreted as being limitative thereof. Accordingly, numerous embodiments of the invention will occur to those skilled in the art without departing from the spirit and scope of the invention.

I claim as my invention:

1. A method for operating a neutronic reactor system capable of containing a fuel material of variable concentration and having high and low critical fuel concentrations, said fuel material being fluidized in a moderating vehicle therefor, said method comprising the steps of initially filling said reactor system with a quantity of said vehicle containing at most fuel material at a concentration below said low critical fuel concentration, adding a quantity of said fuel material to the vehicle contained within said reactor system, bleeding a quantity of said vehicle including the fuel material contained therein from said reactor system and separating said bled quantity into dilute and concentrated fractions of said fuel material in said vehicle, returning said concentrated fraction to said reactor system and continuing the addition of said fuel material to the vehicle and fuel material contained in said reactor system until said low critical fuel concentration is attained within said system and until said reactor system begins to operate, shutting down said reactor system, and further continuing the additions of said concentrated fraction and said fuel material to said reactor system while the latter is maintained in the shut down condition until said high critical fuel concentration is attained within said reactor system.

2. A method for operating a neutronic reactor system capable of containing a fuel material of variable concentration and having high and low critical fuel concentrations and a negative temperature coefficient, said fuel material being fluidized in a moderating vehicle therefor, said method comprising the steps of initially filling said reactor system with a quantity of said vehicle containing at most fuel material at a concentration below said low critical fuel concentration, adding a quantity of said fuel material to the vehicle contained in said reactor system, bleeding a portion of said vehicle including the fuel material contained therein from said reactor system and separating said bled portion into dilute and concentrated fractions of said fuel material in said vehicle, returning said concentrated fraction to said reactor system and continuing the addition of said fuel material to the vehicle and fuel material contained in said reactor system until said low critical fuel concentration is attained within said system, operating said reactor system at said low critical fuel concentration for a period sufficient to build up a substantial quantity of fissional products, increasing the temperature of said system sufficiently to shut down said reactor at said low critical fuel concentration following said operating period, retaining within said system a substantial portion of the heat of radioactive decay of said fissional products while said reactor is in the shutdown condition to maintain said reactor system in a subcritical state until said high critical fuel concentration can be attained, and further continuing the additions of said fuel material and said concentrated fraction to said reactor system until said high critical fuel concentration is attained within said system.

3. A method for operating a neutronic reactor system capable of containing a fuel material of variable concentration and having high and low critical fuel concentrations and a negative temperature coefficient, said fuel material being fluidized in a moderating vehicle therefor, said method comprising the steps of initially filling said reactor system with a quantity of said vehicle containing at most a quantity of said fuel material below said low critical fuel concentration, adding fuel material to the vehicle contained in said reactor system until said low critical fuel concentration is attained therein, operating said reactor system at said low critical fuel concentration for a period sufficient to build up a substantial quantity of fissional products, increasing the temperature of said system sufficiently to shut down said reactor system at said low critical fuel concentration following said operating period, retaining within said reactor system at least a substantial portion of the heat of radioactive decay of said fissional products while said reactor is in the shut down condition to maintain said reactor system in a subcritical state until said high critical fuel concentration can be attained, and continuing the addition of said fuel material to the vehicle and the fuel material contained within said reactor system until said high critical fuel concentration is attained.

4. A method for shutting down a neutronic reactor system capable of containing a fuel material of variable concentration and having high and low critical fuel concentrations and a negative temperature coefficient, said fuel material being fluidized in a moderating vehicle therefor, said method comprising the steps of operating said reactor system at said high critical fuel concentration for a period sufficient to build up a substantial quantity of fissional products, increasing the temperature of said system sufficiently to shut down said reactor system at said high critical fuel concentration following said operating period, bleeding a quantity of the vehicle including the fuel material contained therein from said reactor system and separating said bled quantity into dilute and concentrated fractions of said fuel material in said vehicle, adding to said reactor system a quantity of said vehicle containing at most fuel material at a concentration less than the lowest fuel concentration at which said reactor system can attain criticality, returning said dilute fraction to said reactor system, continuing the addition of said vehicle to said reactor system in an amount equivalent to that of said concentrated fraction until the concentration of fuel material in the vehicle within said reactor system is decreased below said lowest fuel concentration, and retaining within said reactor system at least a substantial portion of the heat of radioactive decay of said fissional products while said reactor is in the shut down condition to maintain said reactor system in a subcritical state until said low critical fuel concentration can be attained.

References Cited by the Examiner

UNITED STATES PATENTS 3,077,445  2/63  Frederick _______________ 176—48

OTHER REFERENCES

Briggs et al.: Proceedings of the First Geneva Conference, 1955, vol. 3, pp. 175–187, published by U.N.

CARL D. QUARFORTH, *Primary Examiner.*